May 22, 1934.　　　　A. J. MAY　　　　1,959,682
EXTENSIBLE CHAIR
Filed April 10, 1931　　　10 Sheets-Sheet 1
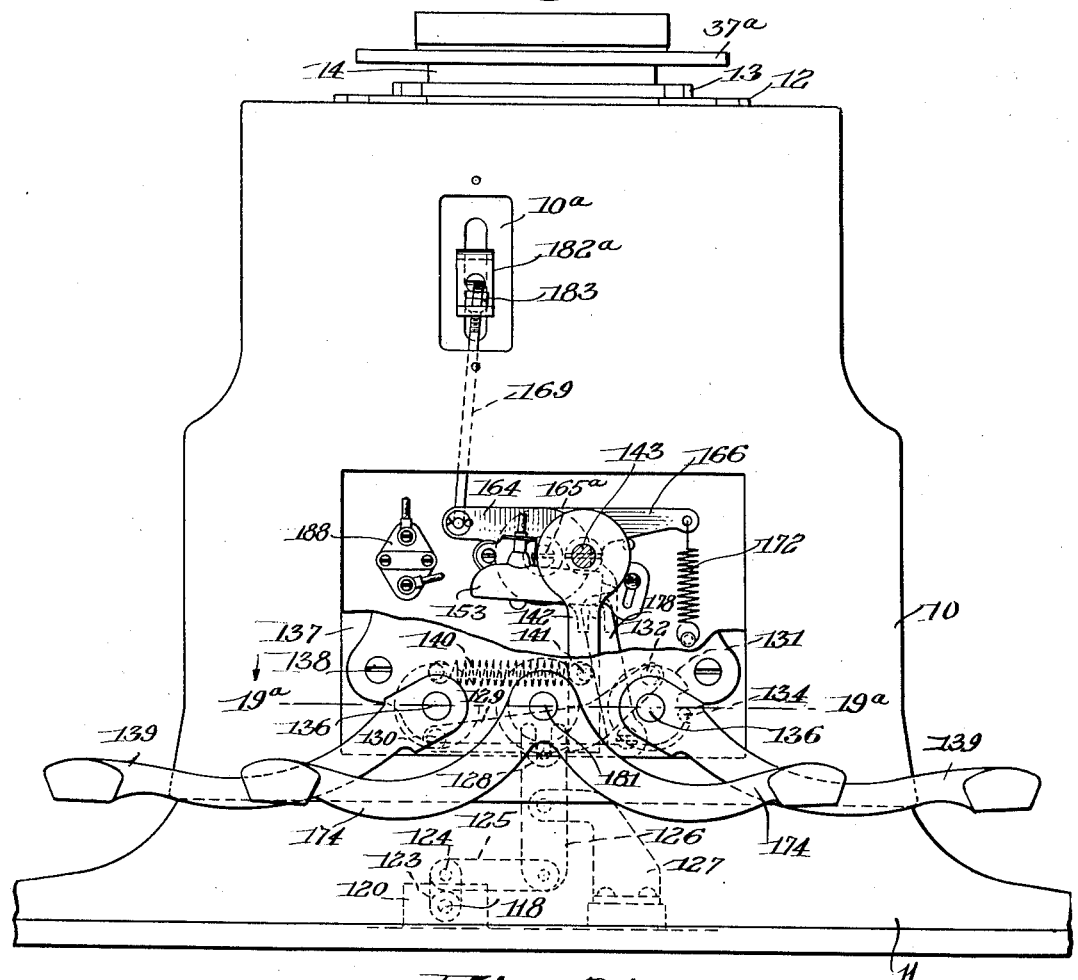
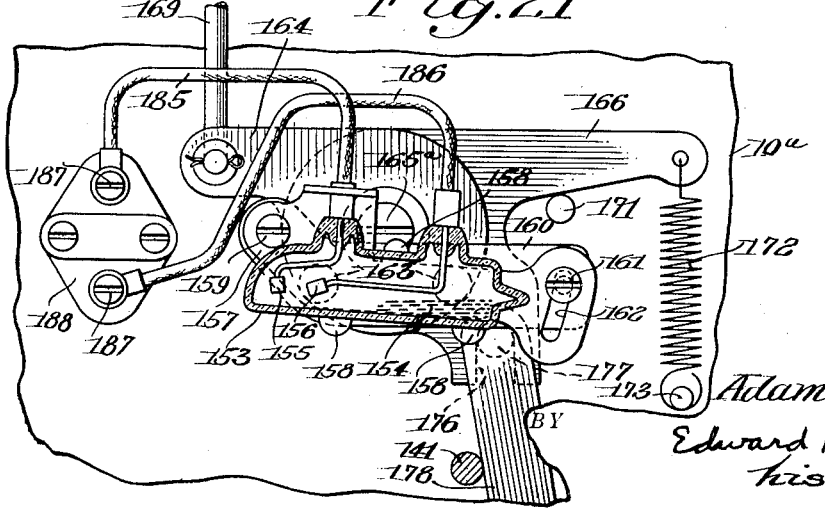
INVENTOR
Adam J. May
BY Edward H. Cumpston
his ATTORNEY May 22, 1934.  A. J. MAY  1,959,682
EXTENSIBLE CHAIR
Filed April 10, 1931  10 Sheets-Sheet 2
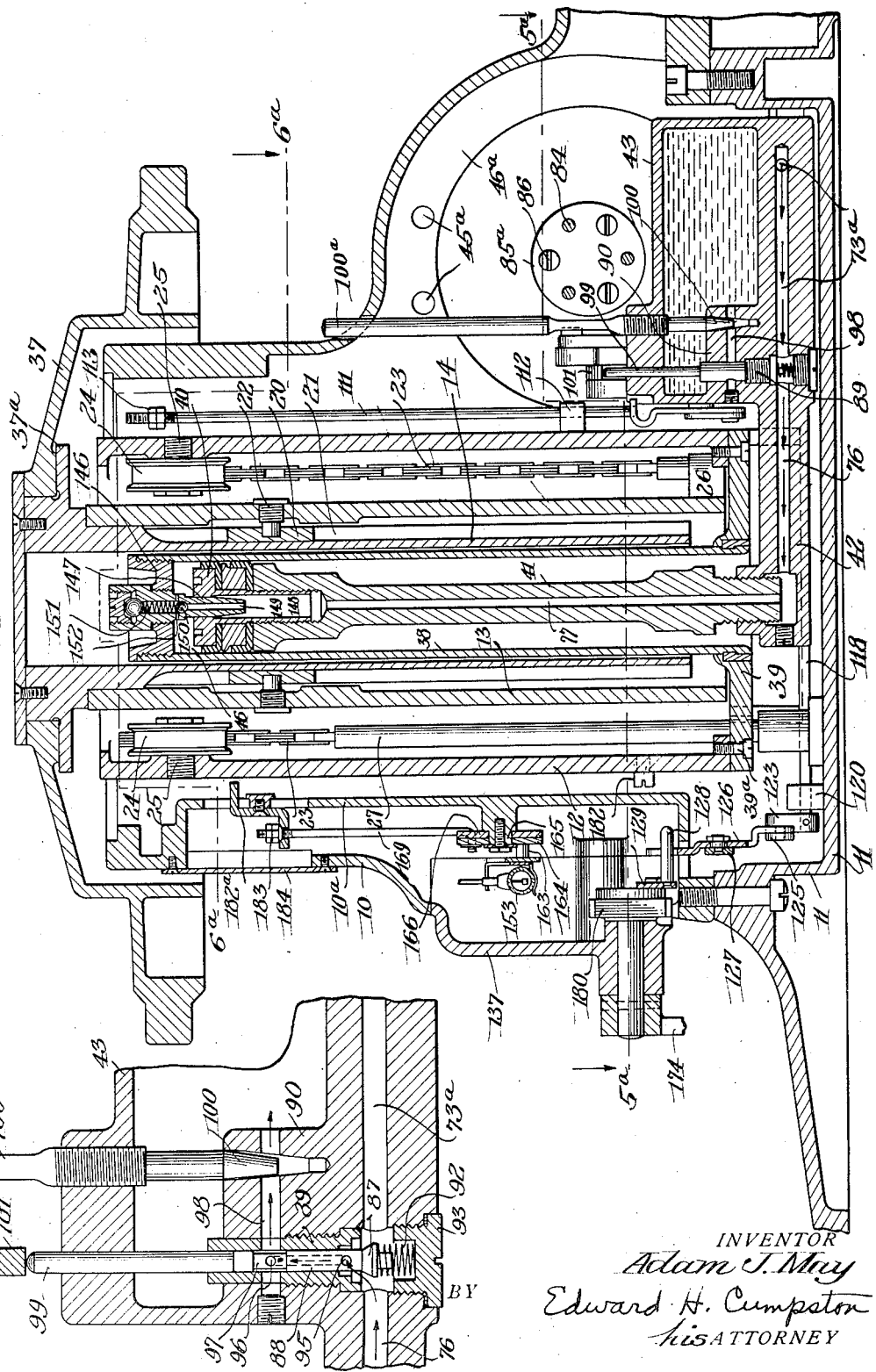
INVENTOR
Adam J. May
BY Edward H. Cumpston
his ATTORNEY May 22, 1934.  A. J. MAY  1,959,682
EXTENSIBLE CHAIR
Filed April 10, 1931   10 Sheets-Sheet 3

INVENTOR
Adam J. May
Edward H. Cumpston
his ATTORNEY

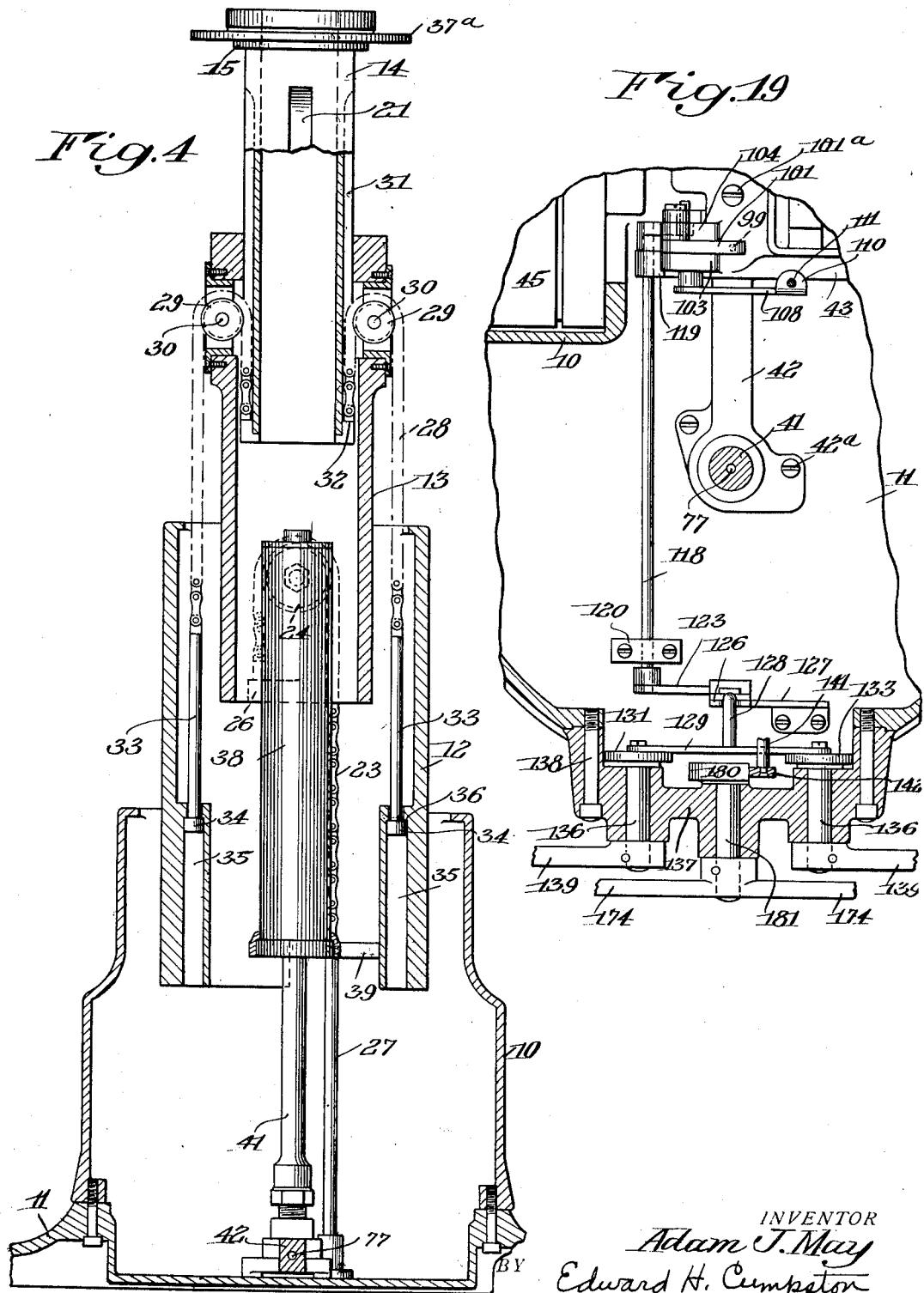

May 22, 1934. A. J. MAY 1,959,682
EXTENSIBLE CHAIR
Filed April 10, 1931 10 Sheets-Sheet 5
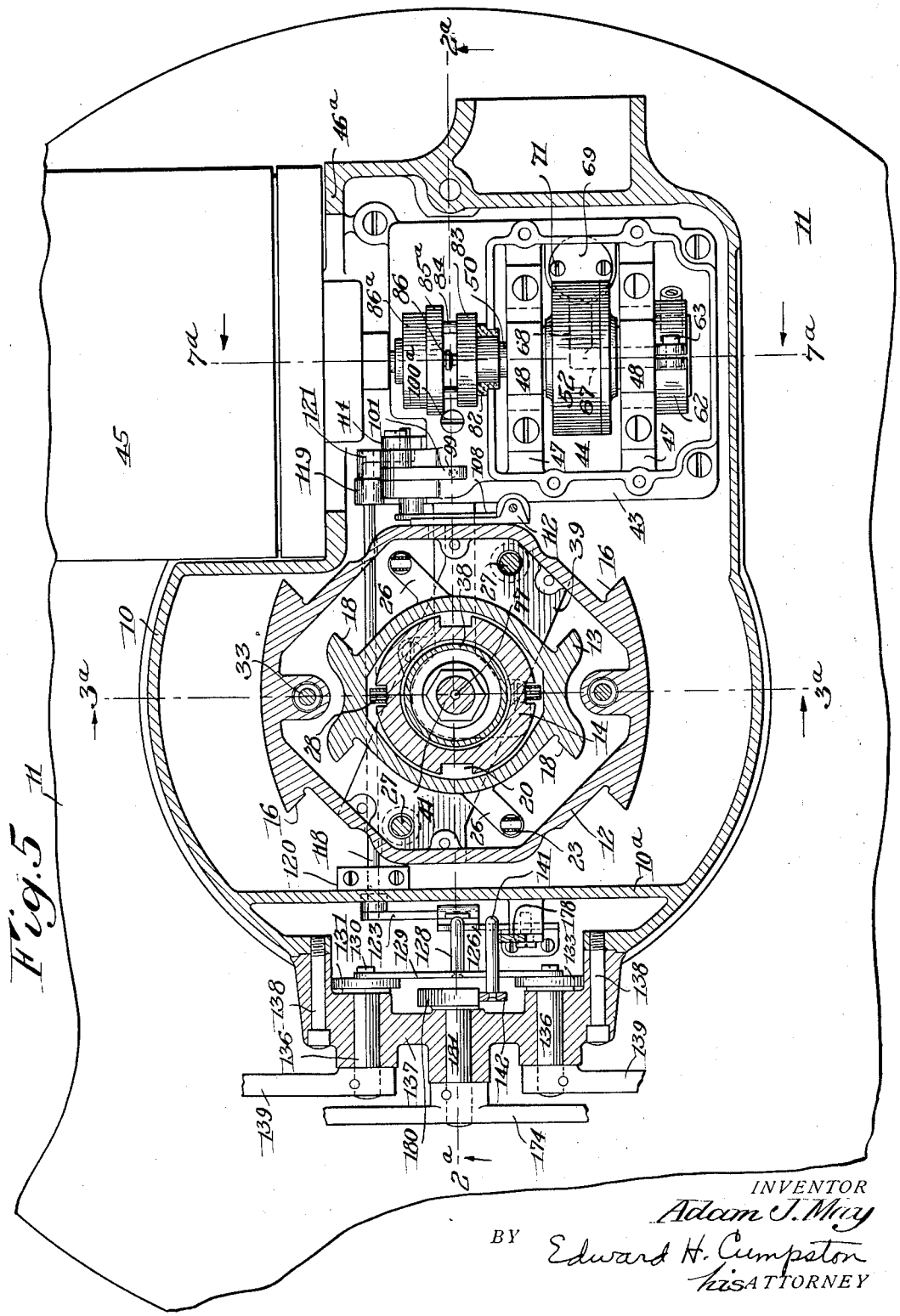
INVENTOR
Adam J. May
BY Edward H. Cumpston
his ATTORNEY May 22, 1934.  A. J. MAY  1,959,682
EXTENSIBLE CHAIR
Filed April 10, 1931  10 Sheets-Sheet 6
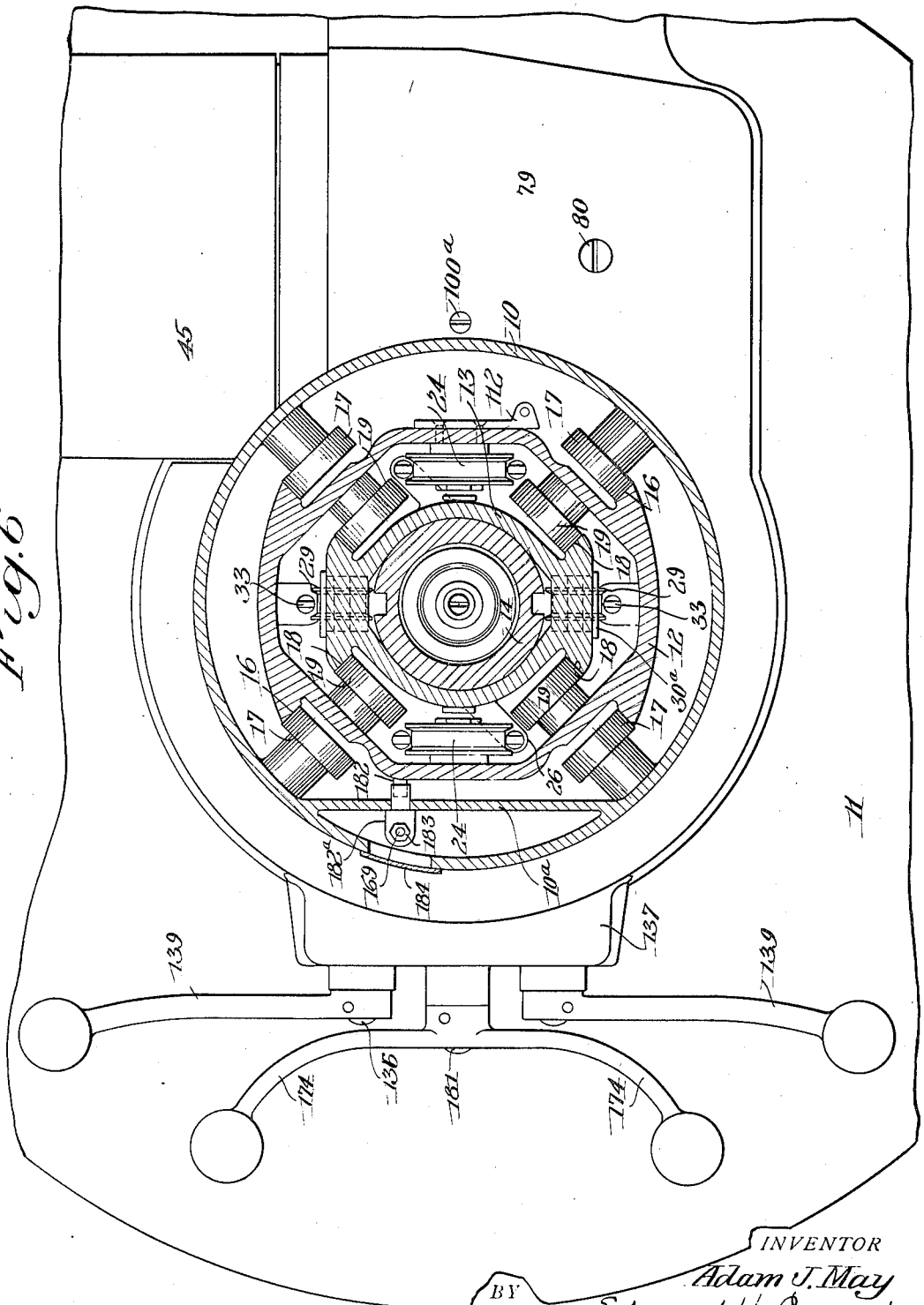
INVENTOR
Adam J. May
BY Edward H. Cumpston
his ATTORNEY

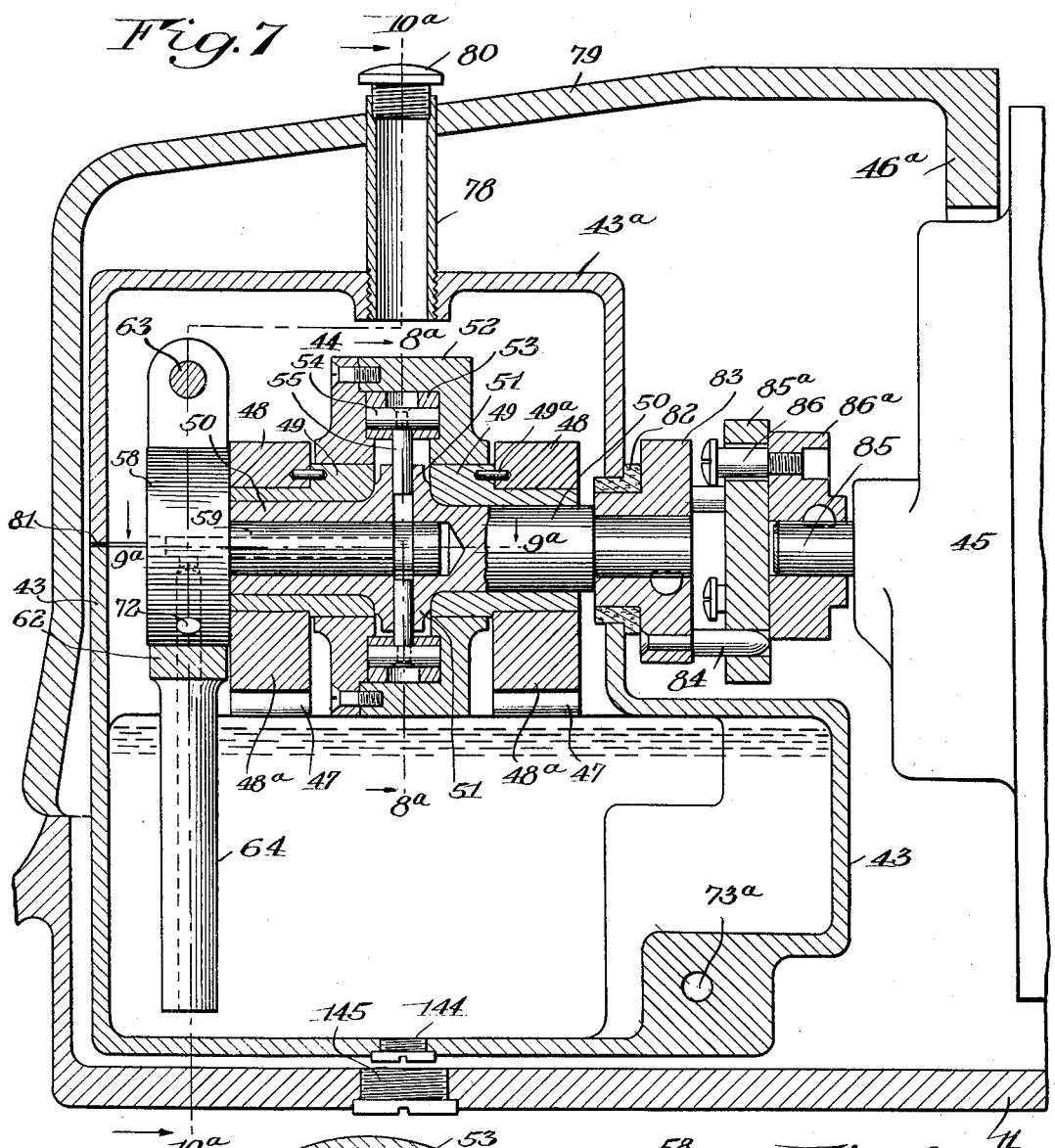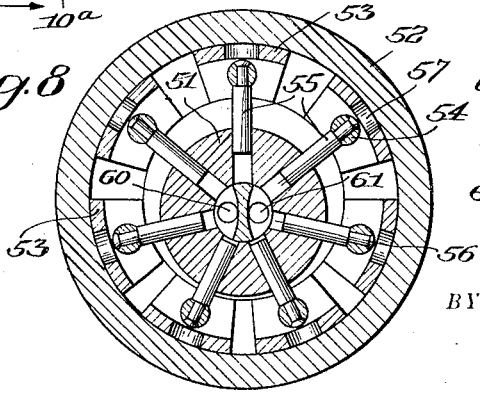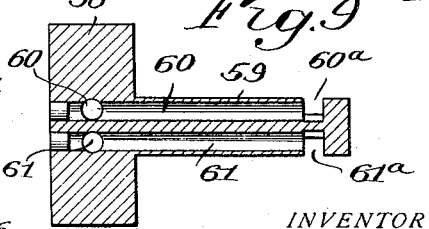

May 22, 1934.  A. J. MAY  1,959,682
EXTENSIBLE CHAIR
Filed April 10, 1931  10 Sheets-Sheet 8
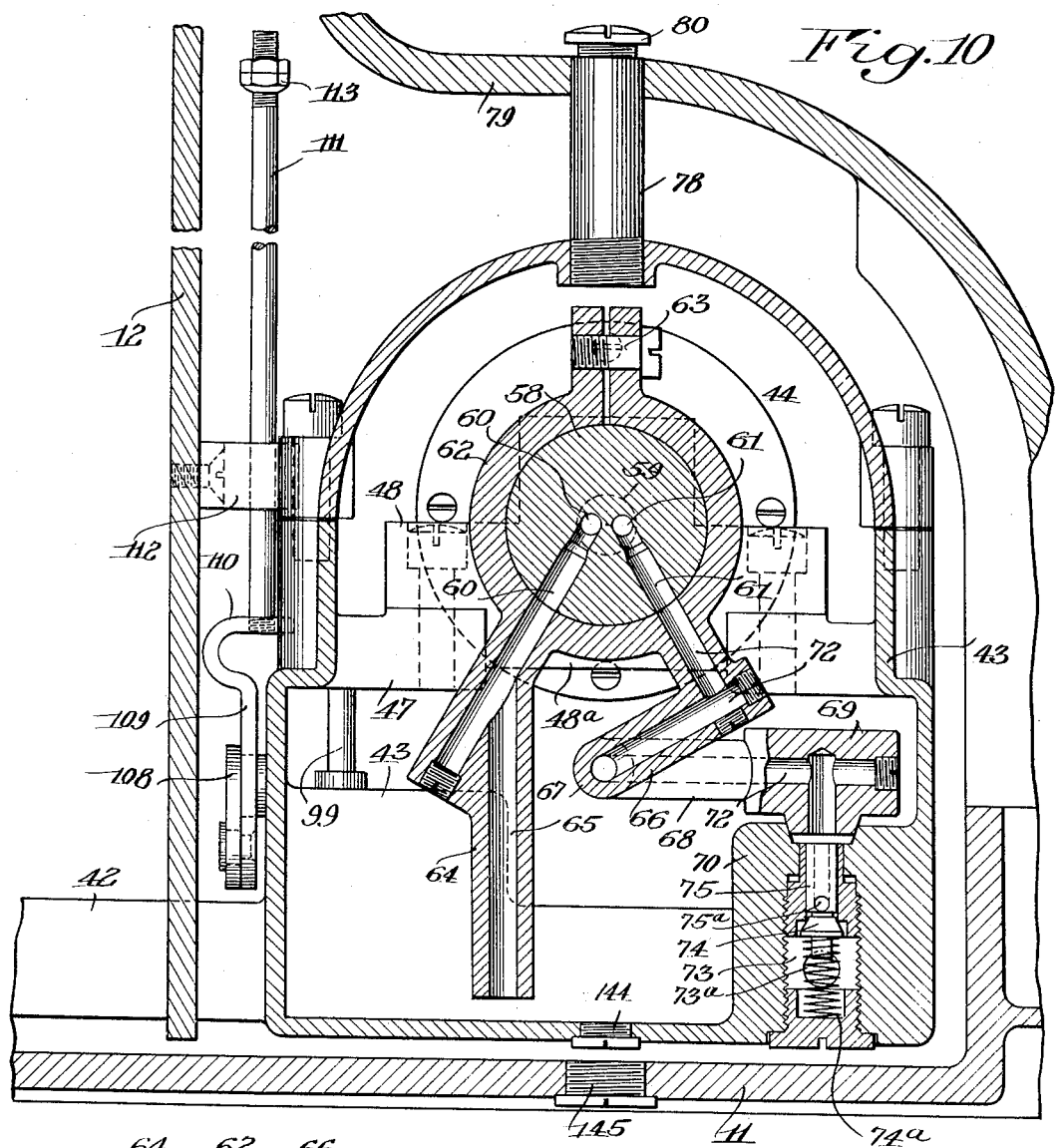
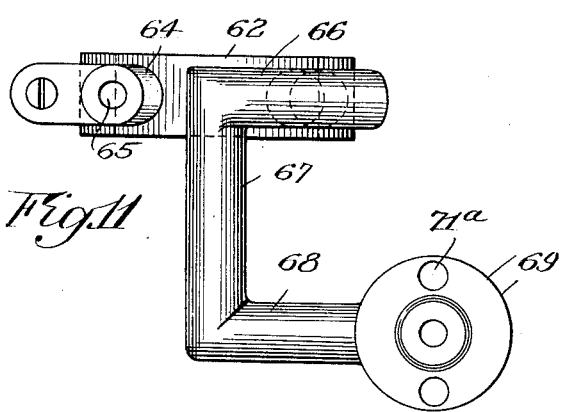
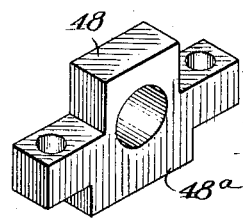
INVENTOR
Adam J. May
BY Edward H. Cumpston
his ATTORNEY May 22, 1934.　　　A. J. MAY　　　1,959,682
EXTENSIBLE CHAIR
Filed April 10, 1931　　　10 Sheets-Sheet 9
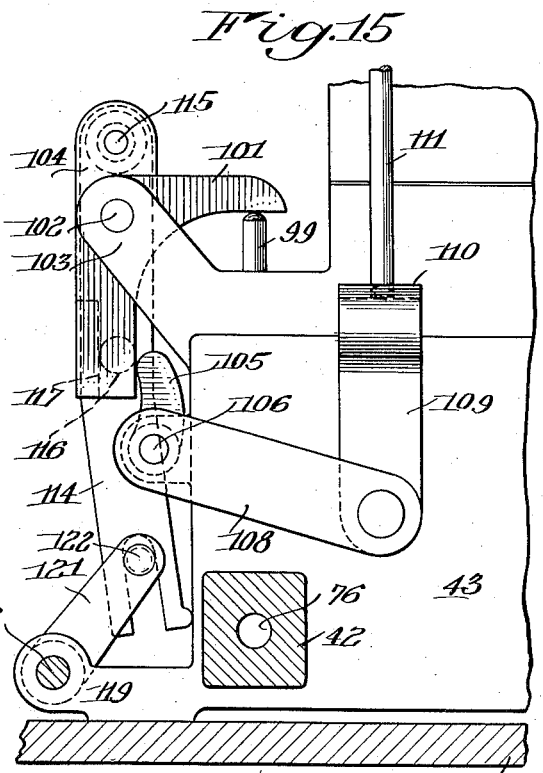
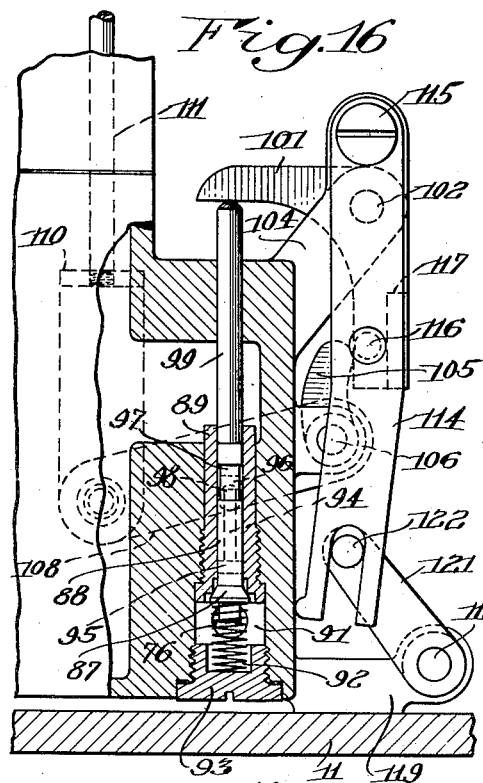
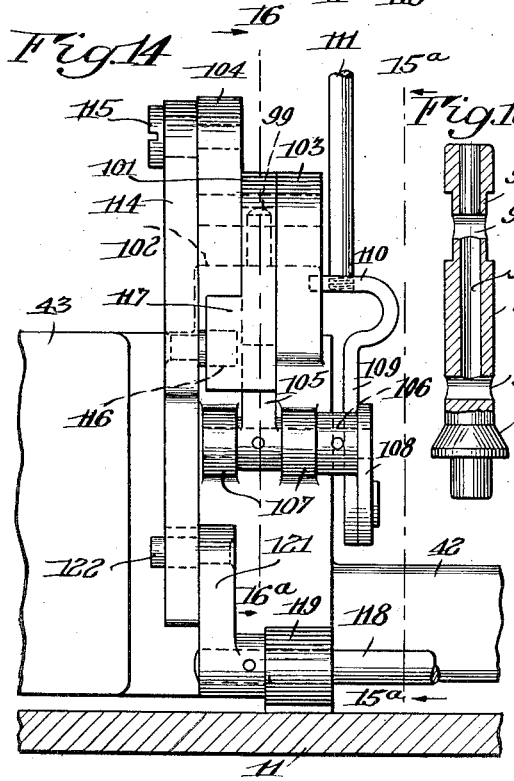
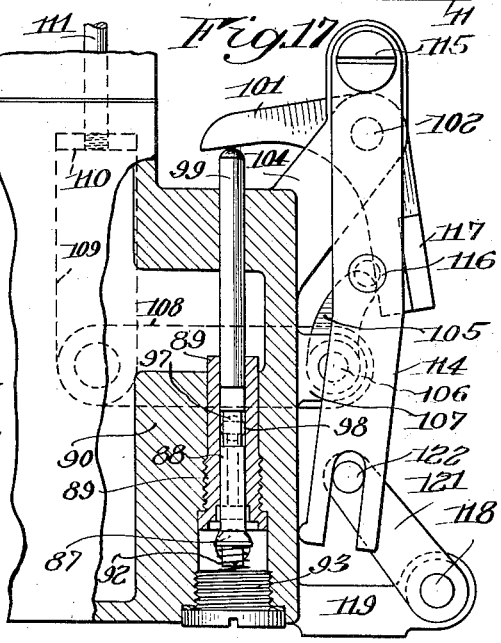
INVENTOR
Adam J. May
BY Edward H. Cumpston
his ATTORNEY May 22, 1934.  A. J. MAY  1,959,682
EXTENSIBLE CHAIR
Filed April 10, 1931  10 Sheets-Sheet 10
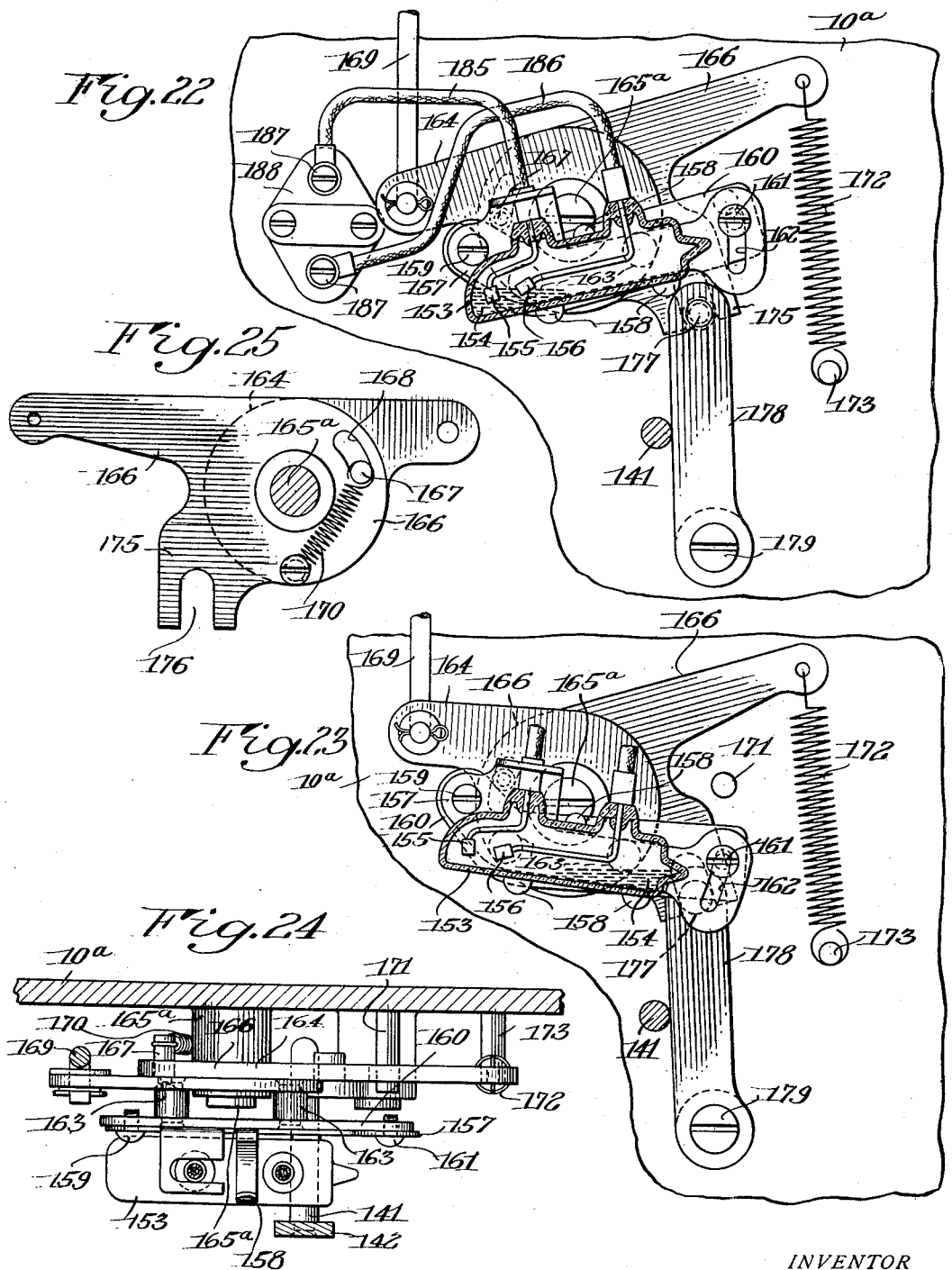

Patented May 22, 1934

1,959,682

UNITED STATES PATENT OFFICE 1,959,682

EXTENSIBLE CHAIR

Adam J. May, Rochester, N. Y., assignor to Ritter Dental Manufacturing Company, Inc., Rochester, N. Y., a corporation of Delaware Application April 10, 1931, Serial No. 529,031

14 Claims. (Cl. 155—25)

The present invention relates to extensible chairs and has for its object to provide an improved chair of this class embodying extensible columns or sections together with improved mechanism for operating the sections and controlling the movements thereof.

A further object of the invention is to provide a new and improved arrangement of chair raising sections which will permit the base of the chair to be shortened and the seat to be moved to a relatively low position as well as to a fully extended position at a maximum distance from the floor.

A further object of the invention is to provide in an extensible chair of this class improved hydraulic means for raising the chair sections together with means for advantageously controlling the movement of the sections whereby to safeguard operation of the chair.

A further object of the invention is to provide improved pressure relief means for the hydraulic system constructed in a manner permitting it to be both manually controlled and automatically operated by the movement of one of the chair raising sections.

A further object of the invention is to provide an improved pump mechanism for building up the pressure in the system to effect elevation of the extensible chair sections.

A still further object of the invention is to provide in a chair of the present type improved operating means for the movable sections employing a fluid pressure system including a rotary pump and an electric motor for driving the same together with automatic control means for the motor circuit and the fluid in the system.

Another object of the invention is to provide an improved switch mechanism for the motor circuit arranged both for manual and automatic operation.

A further object of the invention is to provide an improved extensible chair which is noiseless in operation, convenient to control, efficient in service and which can be operated at a relatively low cost.

To these and other ends the invention resides in certain improvements and combinations of parts, all as will be hereinafter more fully described, the novel features being pointed out in the claims at the end of the specification.

In the drawings:

Fig. 1 is a side elevation of the chair base showing the location of the switch for the motor circuit and a portion of the means for operating the relief valve of the fluid pressure chair raising system;

Fig. 2 is a sectional elevation taken substantially on line $2^a$—$2^a$ of Fig. 5; showing the chair raising sections in lowered position;

Fig. 4 is a sectional elevation similar to Fig. 3 drawn to a reduced scale and showing the sections in extended position;

Fig. 5 is a horizontal section taken substantially on line $5^a$—$5^a$ of Fig. 2;

Fig. 6 is a horizontal section taken substantially on line $6^a$—$6^a$ of Fig. 2;

Fig. 7 is a sectional elevation taken longitudinally of the pump on line $7^a$—$7^a$ of Fig. 5;

Fig. 8 is a transverse section through the pump taken on the line $8^a$—$8^a$ of Fig. 7;

Fig. 9 is a longitudinal section through the pump valve taken on the line $9^a$—$9^a$ of Fig. 7;

Fig. 10 is a transverse sectional elevation through the pump taken on the line $10^a$—$10^a$ of Fig. 7;

Fig. 11 is an inverted plan of a combined inlet and outlet connection for the valve shown in Fig. 9;

Fig. 12 is a perspective view of one of the pump shaft bearings shown in Fig. 7;

Fig. 13 is a fragmentary sectional elevation showing the relative positions of the relief and regulating valves for the fluid pressure system;

Fig. 14 is a fragmentary elevation showing a portion of the pump housing and the operating means for the pressure relief valve;

Fig. 15 is a sectional elevation on line $15^a$—$15^a$ of Fig. 14;

Fig. 16 is a part sectional elevation taken on line $16^a$—$16^a$ of Fig. 14;

Fig. 17 is a view similar to Fig. 16 showing the operating parts of the pressure relief valve in position to unseat the latter;

Fig. 18 is a detailed sectional elevation through the relief valve drawn to an enlarged scale;

Fig. 19 is a horizontal section on line $19^a$—$19^a$ of Fig. 1 with certain parts omitted;

Fig. 21 is a fragmentary sectional elevation of the switch for controlling the motor circuit shown in normal circuit breaking position;

Fig. 22 is a similar view showing the switch in circuit closing position;

Fig. 23 is a view in elevation showing the relative position of the switch parts when operated by one of the chair raising sections to circuit breaking position while the operating pedal for the switch is held in depressed position;

Fig. 24 is a plan view of the switch, partly in section, and

Fig. 25 is a part sectional elevation of certain operating parts for the mercury tube, one of which is arranged to be moved relative to the other by one of the chair columns to break the motor circuit and both being manually operable as a unit to close the circuit.

Similar reference numerals throughout the several views indicate the same parts.

Figure 3:
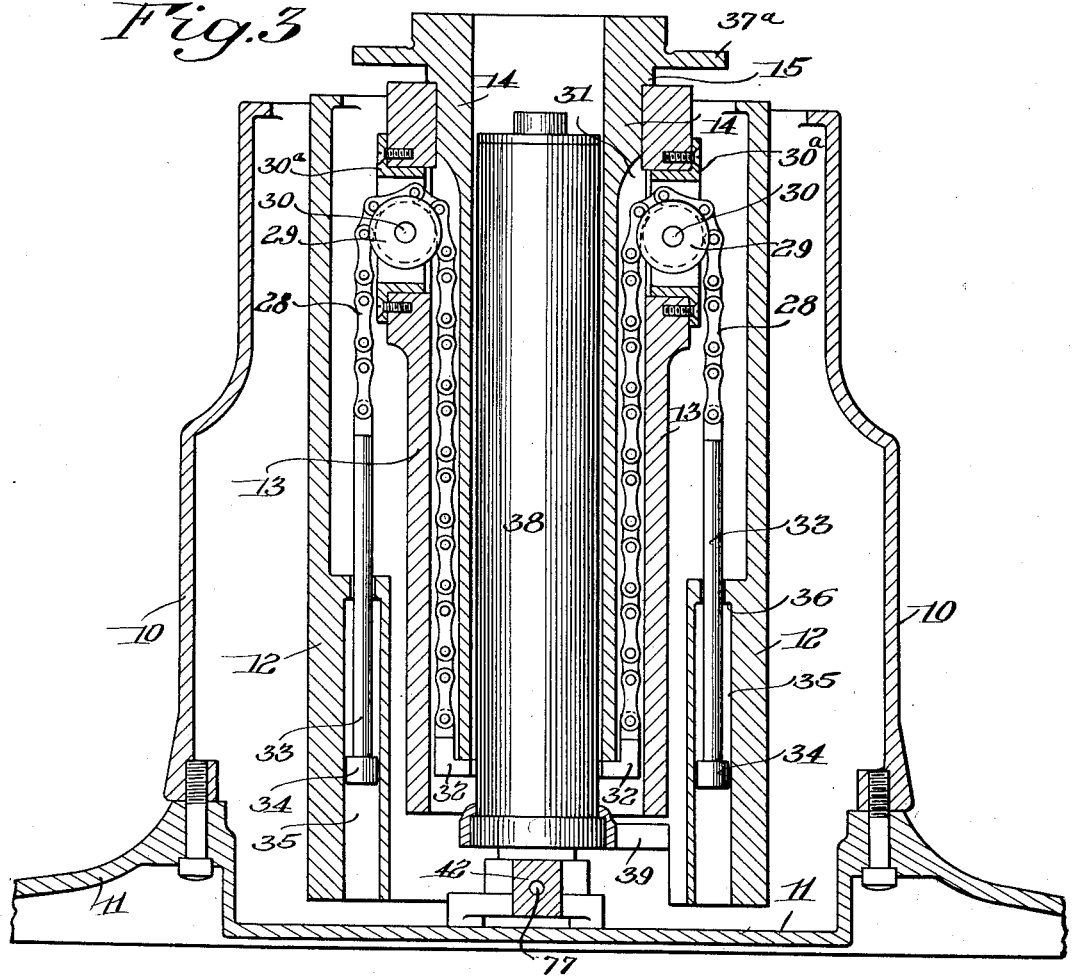
Fig. 3 is a sectional elevation taken on line $3^a$—$3^a$ of Fig. 5.
Figure 20:
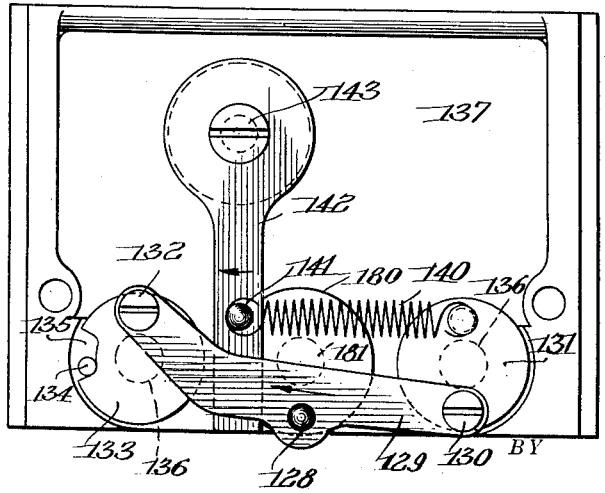
Fig. 20 is a rear elevation of the pedal supporting bracket with certain operating parts for the relief valve shown thereon.

In the present embodiment of the invention, I have shown a chair comprising a plurality of extensible sections, preferably three, whereby to increase the limits of movement of the chair seat and particularly to permit it to be moved to a lower position than has been possible heretofore with chairs of this type. By providing three movable chair raising sections as shown it has been possible to considerably shorten the stationary base or pedestal whereby to permit the seat to descend to an extremely low position without any sacrifice with regard to the extent to which it may be elevated. This has been accomplished in a satisfactory way by what is believed to be a new and novel construction in which the upper seat carrying section preferably remains at rest upon the next succeeding section therebelow during initial operation of the sections or when moving from their lowermost position. The sections are preferably raised by hydraulic mechanism including a pump driven by an electric motor having a switch arranged both for manual operation and for operation by one of the sections when approaching its upper limit of movement. A relief valve is provided for the hydraulic or fluid pressure system and this is also operated by one of the chair raising sections and by manually controled means as well.

Referring to the drawings, 10 represents a base or pedestal supported by a base plate 11 and connected therewith by any suitable means. Disposed within the base are the outer and inner telescoping columns or sections 12 and 13, respectively, and projecting within the inner section is a seat carrying section 14 having a flange out or shoulder 15 seated upon the inner section 13 when said sections are in lowered or non-extended position. The outer section is provided with opposite pairs of vertically extending angularly disposed tracks 16 upon which travel the guide roller 17 which are journaled in suitable bearings on the inner wall of the base 10. The inner section 13 is guided by the outer section, the former having opposite pairs of vertically extending tracks 18 upon which travel the guide rollers 19 journaled in suitable bearings on the inner wall of the outer section.

The seat carrying section is guided by the surrounding wall of the inner section and is prevented from turning therein by means of the keys or shoes 20 located within slots 21 formed in the seat carrying section, the keys being supported on the inner section by screws 22, Fig. 2.

Movement of the inner section from lowered to elevated position is effected by means of a pair of flexible connections, such for example as the chains 23 extending over pulleys 24 rotatably mounted on bearing members 25 carried by the outer section 12. One end of each chain is connected to a lug 26 projecting from the inner section near the bottom thereof, the opposite end of the chain being connected with a rod or post 27 extending upwardly from the base plate 11.

The means for raising the outer section will be subsequently described, but it will be apparent that upon elevating this section the flexible connections 23 will raise the inner section since they extend over the pulleys on the outer section and are anchored to the inner section at one end and to the base at the other end. This arrangement as will be understood, serves to move the inner section upwardly at twice the speed of the outer section.

The chair or seat carrying section is moved from seated position upon the inner section to extended position relative to said inner section by means of flexible connections or chains 28 at the opposite sides thereof. These connections extend over and are operated by the pulleys 29 disposed within the wall of the inner section 13 near the upper end thereof, the pulleys being free to rotate upon suitable supports 30 carried by the flanged ring shaped members 30ª inserted within openings formed in the wall of said inner section as shown in Fig. 3. The chair carrying section is provided at its opposite sides with slots 31 for the reception of the portions of the chains which operate within the inner section, these portions being suitably connected with a lug 32 on the lower end of the chair carrying section 14. The opposite ends of the chains are connected each with a floating anchor 33 having a head 34 free to slide within a guideway 35 on the inner wall of the outer section 12, the arrangement constituting what may be termed a lost motion connection between the chair carrying section and the outer telescoping section 12. Upward movement of the member 33 is limited by engagement of the head with a shoulder 36 on the section 12 at the top of the guideway as shown in Fig. 4. The purpose of this arrangement is to permit the inner section 13 to be elevated to a predetermined position before movement of the chair carrying section from its seat upon the section 13 takes place. As will be seen from the drawings, the arrangement is such that what may be termed the slack in the floating connections 28 must be taken up by movement of the inner section 13 before the chair carrying section will begin to move from its seat upon said section. Such relative movement will of course begin as soon as the head 34 on the member 33 engages the shoulder 36 on the outer section 12 after which time the seat carrying section will move relative to and at a greater rate of speed than the inner section 13 and will therefore be moved to extended position above the inner section. One advantage of employing the floating anchor 33 on the lower end of the chain rather than connecting the latter directly with the outer section 12 is that the weight of the anchor operates to maintain the chain more or less taut and in proper alinement when the telescoping sections are moving from elevated to lowered position.

The seat proper is not shown, but the lower or base portion thereof which is indicated at 37, is mounted upon the flange 37a of the extensible section 14 preferably for rotation thereon about the axis of said section.

While any suitable means may be provided for raising the outer column or section 12 of the chair, I prefer to employ for this purpose hydraulic mechanism constituting a fluid circulating system with means for automatically relieving the pressure in the system when the sections approach the upper limits of their movement. The advantage of this is that if the automatic means for breaking the motor circuit should become defective and fail to function when the sections are fully extended, the continued operation of the pump will not raise the sections above the limits determined upon, since the pressure on the fluid will be immediately relieved, when the sections reach said limits.

The lifting mechanism for the outer section comprises a cylinder 38 centrally disposed with respect to said section and having attached to its lower end a member provided with oppositely extending arm-like portions 39 each of which projects within a recess cut in the bottom portion of said section, said arms being secured to the outer section by screws 39a, Fig. 2. The cylinder has disposed therein a piston 40 fixed on the upper end of a hollow post or standard 41 which preferably has its lower end threaded within a horizontally disposed member 42 suitably attached to the base plate 11 of the pedestal as by means of screws 42a, Fig. 19. The member 42 is preferably cast integral with the pump housing 43, the pump therein being indicated generally at 44 and arranged to be driven preferably by a small electric motor 45 for pumping the fluid into the pressure chamber 46 of the cylinder to elevate the latter.

The pump housing, which is bolted to the base plate 11, is provided with spaced transversely extending supports 47 carrying the oppositely disposed bearing blocks 48, Figs. 10 and 12. The bearing blocks are provided each with a portion 48a which fits snugly between the ends of supports 47 on which the blocks rest. The ends of the supports are preferably machined for proper alinement so that when the blocks are applied thereto the bores therein are also properly alined, thus making it unnecessary to have to adjust the pump shaft bearings for alinement at the time of assembling them within the housing. Inserted within the bores of the blocks are the opposed bearings 49 which are held against turning by one or more pins 49a extending from the blocks into the bearings as shown in Fig. 7. Rotatable within the bearings and eccentric thereto is a pump shaft 50 having intermediate its ends a plurality of cylinders 51 which lie between the inner ends of said bearings for rotation by the shaft, the shaft and cylinders preferably constituting a one-piece construction. A drum 52 comprising a pair of connected rings is rotatably mounted upon said bearings and provided with a plurality of slippers 53 corresponding to the number of cylinders carried by the shaft 50, the slippers having journaled therein wrist pins 54 to which are attached the pistons 55 which operate within the cylinders. The pistons are preferably connected with the wrist pins by inserting their outer reduced end portions through the openings in the pins and heading over said end portions as indicated at 56, this being done by the use of a suitable tool inserted through openings 57 in the outer wall of the slippers. The rings forming the drum are grooved to receive the opposite ends of the slippers, the latter being free to move within the grooves and relative to the drum.

A valve for controlling the passage of fluid to and from the cylinders comprises a cylindrical head-like portion 58 having a stem or shank 59 inserted within a bore of the shaft 50 as shown in Fig. 7. The valve is stationary and is provided with fluid inlet and outlet passages 60 and 61 respectively, extending both radially of the head and longitudinally of the stem and terminating in the transverse recessed portions 60a and 61a disposed in the plane of the cylinders, the fluid drawn into the passage 60a by the pistons being carried over to the passage 61a by the travel of the cylinders during rotation by the motor driven shaft 60. Reciprocation of the pistons is of course effected by reason of the eccentricity of the axes of the shaft 50 and the drum, which operates the pistons.

The head 58 of the valve is connected with and clamped in a split ring 62, the jaws of which are drawn closely together by a bolt 63. The split ring has a tubular inlet conduit 64 depending therefrom to a point adjacent the bottom of the pump housing and within the supply of oil or other fluid contained therein, said conduit having a passage 65 therethrough communicating with the supply passage 60 of the valve, Fig. 10. The split ring also has connected therewith an outlet conduit of angular construction, comprising a depending portion 66 from which extends laterally a substantially horizontal portion 67 carrying a right angle portion 68 terminating in an enlarged head 69 seated upon and secured to the tubular wall portion 70 of the pump housing 43 by means of screws or bolts 71 inserted through holes 71a in said head. The discharge passage 72 of said outlet conduit leads from the outlet passage 61 of the valve to a chamber 73 in the wall portion 70 of the pump housing, Fig. 10. The portions 66 to 69 inclusive, of the outlet conduit, form a support for the split ring 62 and these portions, together with the inlet conduit 64 are preferably cast integral with the ring to afford a rigid and unitary structure rather than one of detachably connected parts. The valve head 58 is firmly gripped and held in position by the split ring so that a tight joint is afforded between the parts to prevent leakage of the fluid. Disposed within the chamber 73 is a pressure operated valve 74 normally closed by a spring 74a, said valve having a hollow stem 75 with a laterally extending passage 75a discharging into the chamber 73 when the valve is lowered at each pressure stroke of the pump. Communicating with the valve chamber 73 is a discharge passage 73a which is continued at 76, and communicates with the vertically disposed passage 77 in the support 41 for the piston 40, Fig. 2.

The upper section 43a of the pump housing is provided with an oil supply tube 78 depending from the substantially horizontal wall portion 79 of the chair base and the tube is provided with a filling cap 80. The joint between the upper and lower sections of the housing is preferably closed by a gasket 81 to prevent the accumulation of dirt within the supply of oil used in the system. Likewise, the opening in the housing through which the pump shaft 50 projects is closed by a sleeve-like member 82 of cork or other suitable material located on the hub of the driving disk 83 for said shaft which carries a plurality of driving pins 84.

Any suitable driving means may be provided between the motor shaft 85 and the pins 84 such as the slip-joint connection for receiving the pins, comprising the member 85a loosely receiving the pins 86 secured to the driving member 86a keyed on the motor shaft, Fig. 7. This arrangement affords a slip-joint connection which permits the motor to be readily applied and withdrawn when desired. The motor is preferably supported by bolts, not shown, extending through holes 45a in the vertical wall portion 46a of the chair base 10.

The control valve for relieving the pressure in the system when the chair sections are to be lowered is indicated at 87 and carries a hollow stem 88 guided in a sleeve 89 threadedly secured within an upstanding wall portion 90 of the pump housing, the valve being movable to release position within a recess 91 which is at all times in communication with the fluid passages 73a and 76, which extend in opposite directions therefrom. A spring 92, supported by a screw plug 93 serves to normally hold the valve upon its seat. The portion of the valve stem above the valve proper is hollow, having therein a longitudinal passage 94 communicating at its lower end with a transverse passage 95 and at its upper end with a transverse passage 96 extending through the reduced portion 97 of the stem. When the valve is moved to the release position shown in Fig. 17, the fluid under pressure in the cylinder chamber 46 will flow therefrom through the passage 76 and enter the lower transverse passage 95 and pass upwardly through the stem to the transverse passage 96 from which it will escape around the reduced portion 97 of the stem to a discharge passage 98 leading through the wall portion 90 back to the supply chamber of the pump housing. Release of the valve is effected by means of a plunger 99 the lower end of which engages the valve stem within the sleeve 89, the upper end of the plunger being extended through and guided by the wall of the pump housing as shown in Fig. 17.

A regulating valve 100 for controlling the speed at which the chair carrying sections descend is interposed in the discharge passage 98, Fig. 2, through which the fluid returns to the supply chamber. By adjusting this valve to different positions the size of the outlet opening 98 for the fluid may be varied, thereby increasing or decreasing as desired the time required for the chair carrying sections to descend from any given raised position to their lowermost position. The regulating valve 100 is of the tapered type so that when adjusted inwardly or outwardly of the passage 98, it will vary the size of the opening to vary the amount of fluid which can escape in a given time to the supply or suction chamber in the bottom of the pump housing. The regulating valve has an operating portion 100a which is accessible from the exterior of the chair base and can be rotated by use of a suitable tool such as a screw-driver.

Operation of the plunger 99 to depress the release valve 87 may be effected either by manually actuated means under the control of the operator or by means actuated by the outer chair raising section 12 when the section is approaching its upper limit of movement as for example, when the operator neglects to open the motor switch in time to stop operation of the pump before the sections reach said limits of movement. The plunger actuating means comprises a lever 101 pivoted at 102 between two upstanding lugs 103 and 104 on the pump housing. The means operated by the chair section 12 for operating the actuating lever to depress the plunger and release the valve is in the form of a bell crank and comprises an upstanding part 105 engaging the vertical arm of the lever and rigid on a pivot member 106 journaled in bearings 107 on the pump housing. The pivot member has an operating arm 108 disposed adjacent one side of the housing and forming a part of the bell crank as shown in Figs. 14 and 15. Pivotally connected with the arm 108 is an upstanding member 109 having a horizontal portion 110 carrying a vertically disposed operating rod 111. The rod extends upwardly at one side of the outer chair section 12 which is provided with a lug 112 through which the rod projects. When the section 12 approaches its uppermost position the lug thereon will engage an adjustable head or nut 113 on the rod whereby to elevate the same for the purpose of rocking the bell crank from the position shown in Fig. 15, to the position shown in Fig. 17, thus swinging the lever 101 upon its pivot and effecting a quick depression of the plunger 99 and valve 87 against the resistance of the spring 92 for seating the valve. The quick automatic release of the valve in this manner permits the pressure in the piston chamber 46 to be immediately diminished to such a degree as to quickly check movement of the chair sections to prevent overrunning or extension of the same beyond the limits determined upon. As soon as a certain amount of the fluid has escaped from the cylinder chamber the chair raising section 12 will descend to a position just below its upward limit of movement in which position it will no longer exert upward pressure on the rod 111, thus permitting the spring 92 to move the valve 87 to closed position as shown in Fig. 16, whereby the chair sections will be held against further downward movement. When thereafter it is desired to lower the chair sections the operator will move the manually controlled means for opening the relief valve as described hereinafter.

The manually operable means for releasing the valve comprises a vertically disposed lever 114 pivoted at 115 to the arm 104 on the pump housing, the lever having intermediate its ends a pin 116 extending in the path of a lug or projection 117 on the vertical arm of the lever 101. Movement of the lever 114 outwardly from the normal position shown in Fig. 16 will cause the pin thereon to swing the plunger operating lever to the release position shown in Fig. 17, whereby to permit the fluid in the cylinder chamber to return to the pump housing whenever it is desired to lower the chair sections from any position of elevation to which they may have been moved.

Operation of the lever 114 is effected by a horizontal rock-shaft 118 journaled in bearings 119 and 120, the former being preferably cast integral with the pump housing and the latter bolted to the base plate 11. The rock-shaft carries an arm 121 having a projection 122 disposed within the lower forked end of the lever 114 so that when the shaft is rocked from normal position it will swing the lever outwardly to effect operation of the plunger actuating lever as previously explained. The opposite end of the rock-shaft is provided with an arm 123 carrying a pin 124 connected with a link 125 which is pivotally connected with an upstanding lever 126, the latter being pivotally supported intermediate its ends by a bracket 127 suitably secured to the base plate 11. The upper end of the lever 126 is forked to receive a pin 128 on a link 129, one end of which is pivotally connected at 130 with the lower side of a rotary disk 131. The opposite end of the link is pivotally connected at 132 with the upper side of a rotary disk 133, the movement of which is limited in opposite directions by a stop pin 134 disposed within an elongated recess 135 formed in the peripheral portion of said disk. The disks 131 and 133 are fixed upon the inner ends of similarly constructed arbors 136 which are journaled in and extended through a bracket or support 137 detachably connected with the chair base by means of screw bolts 138. On the outer ends of the arbors are provided oppositely extending foot pedals 139 each of which when depressed by the operator will, through movement of one or the other of the disks, cause a shifting movement of the link 129 in the same direction whereby to swing the lever 126 to actuate the rock-shaft 118. Movement of the rock-shaft by means of either pedal will swing the lever 114 to operate the lever 101 about its pivotal axis whereby to depress the plunger 99 to unseat the relief valve 87. By the means just described, it will be seen that the operator when at either side of the chair may depress one of the foot pedals 139 to permit the chair sections to be lowered by gravity through the escape of the fluid from the cylinder chamber to the suction chamber of the pump.

A spring 140 is provided for returning the pedals 139 and the parts operated thereby to normal position upon release of the same by the operator, the spring having one end connected with the rotary disk 131 and the other with a pin 141 on a vertically disposed arm 142 pivoted at 143 to the pedal bracket 137.

The pump housing is provided with a drain plug 144 in its bottom wall which is in registry with a larger plug 145 screwed into the base plate 11, Fig. 10, the plug 144 being of a diameter small enough to permit it to be removed through the opening closed by the plug 145.

The cylinder head 146 carries a depending centrally disposed member 147 which is tapered at its lower end and which closely fits within the fluid passage 148 of the piston when the chair sections are in their lowermost position. The member 147 is provided with a longitudinally extending passage 149 closed by a ball valve 150 when the chair sections are in extreme lowered position in which position the valve is held on its seat by a spring 151 disposed within the member 147. When the motor is started to effect operation of the pump and the pressure in the system is built up to a certain degree, the ball valve will be lifted to place the passage 149 in communication with a transverse passage 152 in the member 147 to permit the fluid to escape into the cylinder chamber 46 whereby to effect elevation of the cylinder and the chair sections connected therewith. By tapering the member 147 as shown it will, when moving downwardly within the passage 148 of the piston, effect a gradual decrease in the amount of oil escaping from the cylinder chamber, thus affording a cushioning effect in the movement of the chair sections to their extreme lowermost positions which is desirable in an arrangement of this kind.

The switch means for controlling the motor circuit comprises preferably a switch of the liquid contact type, such for example as a glass tube 153 containing a predetermined quantity of mercury indicated at 154, the mercury affording a quick acting medium whereby to avoid arcing when the tube is swung from one position to another to cause the mercury to flow to and from engagement with the spaced contacts 155 and 156 projecting within the tube whereby to respectively close and open the motor circuit. The tube is carried by a plate 157 having projecting fingers 158 engaging and holding the tube against displacement. The plate is pivoted at 159 to a support 160 having a clamping screw 161 projecting in a slot 162 formed in the plate to permit the latter to be clamped in different adjusted positions to properly control the flow of the fluid within the tube. The support 160 is carried by a pair of studs 163 suitably connected with an oscillatory holder 164 mounted to swing about the axis of a pivot member 165 extending from the vertical wall 10a of the chair base 10, Fig. 2, the holder being secured upon its pivot by a screw 165a. An operating member 166 is positioned at the rear side of the holder to swing about the axis of the pivot member 165. The holder carries a laterally projecting pin 167 free to move in one direction in an arcuate slot 168 in the operating member to permit the holder to be moved relative thereto by a rod 169 when the mercury tube is to be swung to circuit breaking position by one of the chair raising sections when approaching the limit of its upward movement as described hereinafter. A spring 170 having one end connected with the operating member and the other with the pin 167 on the holder serves to return the latter to normal position when moved relative to the operating member by the rod 169 through the pull exerted on the rod by the outer chair column 12 when approaching its upper limit of movement. The operating member 166 is normally held in engagement with a stop 171 by a spring 172 anchored to a post 173 on the wall 10a of the chair base, the spring serving to return the operating member, the holder thereon, and the mercury tube switch on the holder to circuit breaking position when the operator releases the switch pedal 174. It will be understood that movement of the pedal by the operator will, through the medium of the parts explained hereinafter, effect movement of the operating member and the holder as a unit, to shift the mercury tube to circuit closing position. For this purpose the operating member is provided with a downwardly extending arm 175 slotted at 176 to receive a pin 177 on an actuating member 178 pivoted at 179 to the wall 10a of the base. The actuating member 178 is operated by the pin 141 on the pivoted arm 142 carried by the pedal bracket 137. This arm is normally held by the spring 140 in engagement with a cam-like rocker 180 secured on an arbor 181 which is journaled in the pedal bracket 137 and carries the switch operating pedal extensions 174. It will be seen therefore, that no matter which of the pedal extensions is depressed by the operator, that the cam 180 will be rocked in one direction or the other to swing the arm 142 from its normal position and that the pin 141 on the arm will rock the actuating member 178 to cause the pin 177 thereon to swing in an arc and, through sliding engagement with the arm 175 of the operating member 166 to swing the latter upon the pivotal support 165. Movement of the operating member in this manner will rock the holder 164 thereby tilting the mercury tube to circuit closing position. Upon release of the pedal 174 by the operator it will be returned to normal position by the spring 140, which by returning the pivoted arm 142 will cause the cam to assume normal position and likewise the pedal 174 connected therewith. During return of these parts by the spring 140 the operating member 166 together with the holder 164 will be returned to normal position by the spring 172.

The spring 140 not only serves to return the switch pedal to normal position, but also the pedals 139 for operating the relief valve when said pedals are released since the spring is connected with the rotary element 131 and the latter directly connected with one of said pedals and indirectly with the other through the link 129.

In the automatic operation of the switch to break the motor circuit, in cases where the operator fails to release the pedal 174 before the outer chair section reaches its uppermost position, said section by reason of the movement of the lug or projection 182 thereon into engagement with a slide 182a, guided by the wall portion 10a of the base and engaging a head or nut 183 on the rod 169, will exert an upward pull on the rod to swing the tube carrying holder 164 from the tilted position shown in Fig. 22 to the circuit breaking position shown in Fig. 23. In this movement of the switch by the chair, the operating member 166 will remain in the position shown in Fig. 23 while the pin 167 on the holder will move upwardly in the slot 168 of the operating member. However, when the pedal is released the spring 172 will return the operating member to normal position, the chair sections at this time remaining substantially in their uppermost position, although following the automatic opening of the relief valve 87, they will descend slightly or to a point at which the spring 92 is permitted to close said valve, after which the sections can only be lowered by the manual operation of one of the pedals 139 to again open the relief valve. Thus a safeguard is provided against any trouble that might be caused by the extension of the chair sections beyond the limits intended, for not only is the motor circuit broken by the means just described, but the relief valve for the fluid pressure system is also opened at about the same time by the outer chair section, both of these operations being automatic and taking place regardless of whether or not the operator releases the pedal for closing the switch. If, for example, any of the operating parts of the switch actuated by the chair section should become broken, so as to render them ineffective, and the switch is closed by the operator, then without the use of the relief valve and its automatic operation by the chair, there would be no means for preventing continued extension of the sections which would be likely to result in rupture of certain parts of the lifting mechanism. The slide 182a on the wall 10a of the chair base for operating the switch is rendered accessible through an opening in the side wall of the base which is normally closed by a cover plate 184, Fig. 2.

The electrodes 155 and 156 of the tube 153 have flexible connections 185 and 186 extending therefrom which permit the tube to swing freely between normal open and circuit closing positions. The connections have their outer ends attached to the binding posts 187 which are connected with the motor in a suitable manner, not shown, the binding posts being carried by a plate 188 suitably connected with the wall 10a of the chair base.

In the operation of the chair, assuming that the seat raising sections are in their lowermost position, the operator will depress the switch pedal 174 to swing the mercury tube switch to closed position whereby to start the motor and through it the operation of the pump. The fluid in the pump housing will then be pumped through the hollow piston stem into the pressure chamber of the chair raising cylinder. The cylinder then operates to elevate the outer chair section 12 which at the same time will raise the inner section 13 through the lifting action of the flexible connections 23. During elevation of the inner and outer sections to a predetermined position, or until such time as the lost motion of the flexible connections 28 is compensated for, the seat carrying section 14 will remain at rest upon the inner section 13. However, if the section 13 is extended above said predetermined position, movement of the seat carrying section relative to section 13 will immediately take place and will continue until the sections reach their uppermost position if the operator continues to hold down the foot pedal. In this event, not only will the switch be automatically moved to circuit breaking position through the pull exerted on the rod 169 by the outer chair section 12, but at or about the same time, said section will also operate, through the connection provided, to unseat the pressure relief valve 87 whereby to relieve the pressure in the cylinder to prevent further extension of the chair sections. While the automatic operation of the relief valve by the outer chair section 12 will serve to prevent extension of the chair sections beyond their limits of movement regardless of whether or not the motor circuit is broken, it is desirable to provide means for automatically stopping operation of the motor at the time of opening the valve, not only to prevent wear by unnecessary operation of the motor, but also to prevent continued pulsating or rising and falling of the sections within the limits of control of the relief valve which would result, if the operator or any unauthorized person continued to hold down the switch pedal after the chair sections reached their uppermost position. This would result in a continued pumping of the oil which would be detrimental to its use since it has been found that under these conditions it has a tendency to thicken or congeal and become unfit for service, thus requiring more frequent periods of replenishing in order to obtain the best results in the operation of the chair.

It will be understood that the chair sections may be brought to rest at any desired point of elevation merely by releasing the switch pedal whereby to break the motor circuit for the purpose of discontinuing operation of the motor and the pump. Furthermore, the chair sections can readily be lowered from any given raised position by depressing one or the other of the foot pedals 139 for opening the relief valve to permit the oil to escape from the pressure chamber in the cylinder and return to the suction chamber in the pump housing.

It will be noted that the pedals for operating the relief valve have been placed adjacent those for operating the switch so that the operator can conveniently depress either without changing his position with respect to the chair. Furthermore, the arrangement of the pedals is such that both the switch and relief valve can be operated from either side of the chair base.

The operating and control mechanisms for the chair have been designed particularly with a view to insuring quietness in operation, and this is especially true with regard to the pump which is successfully operated by a relatively small electric motor preferably one of not more than one-quarter horse power.

A decided advantage is obtained in the three tube arrangement of chair raising sections since it permits a shorter base to be used, thus making it possible to drop the chair to an extremely low position which is often desirable where the patient is unusually tall as well as in the case of certain operations which can be more conveniently performed with the patient in a lowered position. The three tube chair also permits the seat to be moved to a relatively high position which is especially desirable in cases where the dentist is operating upon or treating the teeth of children.

I claim:

1. In an extensible chair, a base, a plurality of seat raising sections carried by the base, means for raising one of said sections, mechanism actuated by the last mentioned section operative to extend the remaining sections to a predetermined position, said remaining sections being elevated by said mechanism to said position without relative movement, and means actuated by one of said remaining sections subsequent to movement to said position operating to extend another relative thereto.

2. In an extensible chair, a base, three seat raising sections carried by the base, means for raising one of said sections, means actuated by said last mentioned section operating to elevate another of the sections to a predetermined position, the third section being seated upon the last mentioned section and remaining at rest thereon during movement of the latter to said predetermined position, and means actuated by said last mentioned section when moved above said predetermined position operating to move the third section relative thereto.

3. In an extensible chair, a base, main, intermediate and upper seat raising sections carried by the base, means for raising said main section, flexible connections between the base and intermediate section actuated by the main section during elevation thereof to extend the intermediate section to a predetermined position, the upper section being seated upon the intermediate section and remaining at rest thereon during movement of the intermediate section to said predetermined position, and a flexible lost motion connection between said main and upper sections for extending the latter relative to the former and actuated by the intermediate section when the latter is projected above said predetermined position.

4. In an extensible chair, a base, relatively movable seat raising sections carried by the base, means for raising one of said sections, means actuated by said last mentioned section operative to elevate another of the sections, a seat carrying section mounted upon one of said relatively movable sections and remaining at rest thereon during advancement thereof to a predetermined position, a flexible lost motion connection between said seat carrying section and one of said relatively movable sections, and a rotary supporting element for said flexible connection positioned on the relatively movable section upon which the seat carrying section is mounted, said last mentioned relatively movable section during movement to said predetermined position operating to take up the slack in said flexible connection whereby to permit of movement of the seat carrying section relative to the section on which it is mounted.

5. In an extensible chair, a base, relatively movable seat raising sections carried by the base, means for raising one of said sections, means actuated by said last mentioned section operative to elevate another of the sections, a chair carrying section seated upon one of said relatively movable sections when the latter is in non-extended position, a flexible lost motion connection between said seat carrying section and one of said relatively movable sections, the latter having a shoulder thereon, a rotary supporting element for said flexible connection disposed on the relatively movable section upon which the chair carrying section is seated, said connection including a slide movable from a lowered position upon the section having the shoulder to engage said shoulder when said relatively movable sections are being elevated whereby to take up the slack in said connection to permit movement of the chair carrying section from the seat of the section on which it is mounted.

6. In an extensible chair, a base, telescoping inner and outer sections carried by the base, a seat carrying section disposed within said inner section and movable to extended position relative thereto, mechanism for raising one of said telescoping sections, mechanism responsive to the raising movement of the last mentioned telescoping section for elevating the other of said telescoping sections, and means actuated by said inner section to extend said seat carrying section relative thereto, said means being operative to begin movement of the seat carrying section relative to said inner section after the latter has been elevated to a predetermined position.

7. In an extensible chair, a base, telescoping inner and outer sections carried by the base, a seat carrying section guided by the inner section, means for raising one of said telescoping sections, means operated by the last mentioned telescoping section for raising the other of said telescoping sections, and mechanism responsive to one of the telescoping sections during elevation thereof operating to move the seat carrying section upon said inner section to extend it relative thereto.

8. In an extensible chair, a base, telescoping inner and outer sections carried by the base, a seat carrying section mounted for extension upon the inner section, a flexible connection interposed between the seat carrying section and the outer section having a predetermined amount of slack when the sections are in lowered position and operated by the inner section to effect relative movement between the latter and said seat carrying section when the slack is taken up, means operated by movement of the outer section to move the inner section to take up the slack in said connection and to subsequently move the seat carrying section relative thereto, and mechanism operatively associated with the outer section for elevating the latter.

9. In an extensible chair, a base, telescoping inner and outer tubular sections carried by the base, a chair carrying section within the inner section guided thereby and having a shoulder seated upon the inner section when said sections are in lowered position, oppositely disposed pulleys mounted in the wall of the inner section, flexible connections extending over said pulleys each having one of its ends connected with the chair carrying section and its other end connected with said outer section, said connections when the sections are in lowered position having a predetermined amount of slack therein whereby movement of the chair carrying section from seated position upon the inner section will be effected after said inner section has been elevated to a predetermined position sufficient to take up the slack in said connections, means actuated by the outer section for raising said inner section, and mechanism for raising said outer section.

10. In an extensible chair, a base, telescoping inner and outer sections on the base, a seat carrying section at rest upon the inner section during movement thereof from a lowered to a predetermined elevated position, mechanism responsive to movement of one of said telescoping sections for moving said seat carrying section upon the inner section to extended position relative thereto subsequent to movement of the inner section to said predetermined position, mechanism for elevating the outer of said telescoping sections, and means arranged for operation by said outer section for elevating the inner section to and above said predetermined position whereby to elevate and extend said seat carrying section upon the inner section.

11. In an extensible chair, a base, telescoping inner and outer sections carried by the base, a chair carrying section guided by the inner section, means independent of the chair carrying section for raising the outer telescoping section, lifting means operated by the outer telescoping section for raising the inner telescoping section to a predetermined position without relative movement of the inner and seat carrying sections, said lifting means operating to continue movement of the inner section above said predetermined position, and raising means interposed between the chair carrying section and said outer section for moving the chair carrying section relative to the inner section subsequent to movement of the inner telescoping section to said predetermined position, said raising means being operated by the inner section when moving above said predetermined position.

12. In an extensible chair, a base, telescoping inner and outer sections carried by the base, guide means on the base for the outer section, guide means on the outer section for the inner section, a chair carrying section guided by the inner section, the latter having a seat on which the chair carrying section rests when the sections are in lowered position, means for raising the outer of said telescoping sections, lifting means operated by the last mentioned telescoping section for raising the inner telescoping section and the chair carrying section to a predetermined position without movement of one relative to another, said lifting means operating to continue the movement of the inner section above said predetermined position, and means operated by the inner section for raising the chair carrying section from the seat of the inner section subsequent to movement of the inner section to said predetermined position.

13. In an extensible chair, a base, telescoping inner and outer sections carried by the base, guide means on the base for the outer section, guide means on the outer section for the inner section, a chair carrying section guided by the inner section, the latter having a seat on which the chair carrying section rests when the sections are in lowered position, means for raising one of said telescoping sections, lifting means operated by the last mentioned telescoping section for raising the other of said telescoping sections and said chair carrying section to a predetermined position without movement of one relative to another, and elevating means for raising the chair carrying section from the seat of the inner section subsequent to movement of the latter to said predetermined position, said means including a lost motion device, a flexible connection between said chair carrying section and one of said telescoping sections, and a pulley mounted on and actuated by the other of said telescoping sections during elevation thereof, said elevating means operating through cooperation with one of the telescoping sections to support the chair carrying section in raised position with respect to the seat of the inner telescoping section.

14. In an extensible chair, a base, relatively movable sections carried by the base, means for elevating one of said sections, means for moving another relative thereto, a seat carrying section mounted upon one of said relatively movable sections and remaining at rest thereon during elevation thereof to a predetermined position, and means operated by one of the relatively movable sections and operating during movement thereof to move the seat carrying section relative to the section on which it is mounted subsequent to advancement of the latter to said predetermined position.

ADAM J. MAY.